United States Patent [19]

Nagai et al.

[11] Patent Number: 4,563,578

[45] Date of Patent: Jan. 7, 1986

[54] BEAM TYPE SAFETY DEVICE

[75] Inventors: Shunichi Nagai; Kazuo Hiramura, both of Komatsu, Japan

[73] Assignee: Kabushiki Kaisha Komatsu Seisakusho, Tokyo, Japan

[21] Appl. No.: 573,381

[22] Filed: Jan. 24, 1984

[30] Foreign Application Priority Data

Jan. 31, 1983 [JP] Japan .................................. 58-14281

[51] Int. Cl.$^4$ .............................................. G01V 9/04
[52] U.S. Cl. .................................. 250/221; 250/222.1
[58] Field of Search ..................... 250/221, 222.1, 208, 250/209, 214 R; 340/555, 556, 557

[56] References Cited

U.S. PATENT DOCUMENTS 3,764,813 10/1973 Clement et al. ..................... 250/221
3,970,846 7/1976 Schofield et al. ................... 250/209
4,384,201 5/1983 Carroll et al. ....................... 340/556

Primary Examiner—David C. Nelms
Attorney, Agent, or Firm—Diller, Ramik & Wight

[57] ABSTRACT

A beam type safety device having a plurality of light emitting elements and a plurality of light receiving elements associated with the light emitting elements wherein the light emission operation of the light emitting elements and the light receiving operation of the light receiving elements are sequentially scanned and the interception of any of the light beams from the light emitting elements to said light receiving elements is detected based on the outputs of the light receiving elements, comprises a first memory for storing the outputs of the light receiving elements, the data thus stored being cleared before the scan of the relevant light receiving elements and a second memory for storing the outputs of the first memory after the scan of the relevant light receiving element to provide the light interception detection output.

5 Claims, 5 Drawing Figures

BEAM TYPE SAFETY DEVICE

BACKGROUND OF THE INVENTION

1. Field of the Invention

The present invention relates to a beam type safety device to be used for a press and the like machines, and in particular, a beam type safety device with improved light interception detection speed when a light beam is intercepted.

2. Description of Prior Art

Beam type safety devices have been used in various industrial machines, such as a press, to detect the entry of the operator's hand or the like into a specified hazardous area of the machine.

FIG. 1 shows a typical circuit configuration of the prior art beam type safety device, in which a plurality of light emitting diode LED1 to LEDn are for providing a beam screen formed by a plurality of light beams in a specified hazardous area (not shown), and a plurality of phototransistors PHT1 to PHTn are for receiving lights emitted from the light emitting diodes LED1 to LEDn respectively. That is, the plurality of light emitting diodes LED1 to LEDn and the plurality of the corresponding phototransistors PHT1 to PHTn are disposed so as to face to each other across the specified hazardous area.

Outputs of the phototransistors PHT1 to PHTn are fed to amplifiers A1 to An respectively. The amplifiers A1 to An output a low level signal when the corresponding phototransistors PHT1 to PHTn are in the light receiving state. The amplifiers A1 to An output a high level signal when the corresponding phototransistors PHT1 to PHTn are in the light non-receiving state, namely, when the corresponding light emitting diode LEDk does not emit light or when the light beam emitted from the light emitting diode LEDk to the phototransistor PHTk is intercepted. The light emitting operation by the light emitting diodes LED1 to LEDn and the light receiving operation by the phototransistors PHT1 to PHTn are sequentially scanned by a scanning circuit 10 comprised of a clock pulse oscillator 11, a counter 12, a decoder 13, and a driver 14. The counter 12 counts pulse signals of a specified frequency generated by the clock pulse oscillator 11, the count value of the counter 12 is decoded by the decoder 13, and the output of the decoder 13 is fed to the light emitting diodes LED1 to LEDn via the driver 14. Thus, the light emitting diodes LED1 to LEDn are sequentially lit by the drive pulse outputted from the driver 14.

The drive pulse outputted from the driver 14 is fed to the amplifiers A1 to An. As a result, the amplifiers A1 to An perform amplification of the outputs of the phototransistors PHT1 to PHTn synchronized with the lighting of the light emitting diodes LED1 to LEDn. Thus, the light receiving operation of the phototransistors PHT1 to PHTn are performed. The output of the amplifiers A1 to An are fed to respective hold circuits H1 to Hn comprised of a resistor R and a capacitor C. The hold circuit H1 to Hn, when the output of the amplifier A1 to An becomes low level as a result of light reception at the phototransistor PHT1 to PHTn, is kept at low level until the next scan.

Referring to FIG. 2, when light receiving signals as shown in (a) to (c) are output from the amplifiers A1 to An corresponding to the scan of the light emitting diodes LED1 to LEDn, these signals are transformed into waveforms shown in (d) to (f) due to the time constant by the resistor R and the capacitor C of the hold circuits H1 to Hn, and the outputs of the hold circuits H1 to Hn are held at the low level. Dash lines of (d) to (f) of FIG. 2 indicate the threshold levels for determining if the level is the low level. The outputs of the hold circuits H1 to Hn are integrated through diodes D1 to Dn respectively, and further fed to the base of a transistor Tr1. Here, when all light beams from the light emitting diodes LED1 to LEDn to the phototransistors PHT1 to PHTn are not intercepted, a voltage generating at a bias setting resistor R2 is at the low level, and the transistor Tr1 is in non-conductive state. The collector of the transistor Tr1 is fed to the base of a transistor Tr2 through a resistor R4 and a diode D. The capacitor C is connected between the junction point of the resistor R4 and the diode D and the ground. When the transistor Tr1 is non-conductive, a voltage V1 is at the collector of the transistor Tr1, the transistor Tr2 becomes conductive via the voltage V1, and a light interception detecting relay coil L connected to the collector of the transistor Tr2 is excited. That is, the detection condition is such that none of the light beams from the light emitting diodes LED1 to LEDn to the phototransistors PHT1 to PHTn is intercepted.

On the other hand, when any of the light beams from the light emitting diodes LED1 to LEDn to the phototransistors PHT1 to PHTn is intercepted, the output of the amplifier Ak for amplifying the output of the phototransistor PHTk relevant to the intercepted beam stays at the high level, the output of the corresponding hold circuit Hk becomes the high level accordingly, the transistor Tr1 becomes conductive thereby, the collector of the transistor Tr1 the low level due to the presence of a collector resistor R3 of the transistor Tr1, the charged electricity is discharged, the transistor Tr2 becomes non-conductive, and the light interception detecting relay coil L becomes non-excited. Thus, the light interception detection state occurs.

In the case of prior art beam type safety device comprised of aforementioned circuits, as apparent from FIG. 2, the time constant should be set longer than a single scan time for the light emitting diodes LED1 to LEDn, and as a result, it takes a considerably long time from the occurrence of light interception for the light interception detecting relay coil L to become non-excited state. This tendency becomes more remarkable as the number of light beams (optical axes) increases. This fact is a problem not neglectable for a safety device whose purpose is to promptly detect the entry of the hand or the like to the hazardous area, and involves the possibility of resulting in a serious accident.

In addition, in the case of the prior art circuit, to supress the noise, an intergrating circuit comprised of the resistor 4 and the capacitor C2 must be inserted, further lengthening the light interception detection time.

SUMMARY OF THE INVENTION

The present invention is directed to eliminate aforementioned disadvantages of the prior art device, and an object of this invention is to provide a beam type safety device with a very short light interception detecting time.

To achieve the above mentioned object, the beam type safety device of the present invention has a plurality of light emitting elements and a plurality of light receiving elements arranged to be associated with the light emitting diodes, in which the light emitting operation of the light emitting elements and the light receiving operation of the light receiving elements are sequentially scanned to sequentially detect the interception of any of the light beam from the light emitting elements to the light receiving elements. This device is also provided with a first memory means for storing the outputs of the light receiving elements, the stored information being cleared prior to the scan of the light receiving elements and a second memory means for storing the output of the first memory after the scan of the light receiving elements. The safety device is designed to obtain the light interception output from the second memory so as to shorten the light interception detection time to a large extent.

DETAILED DESCRIPTION OF THE INVENTION

An embodiment of the present invention will now be described in detail with reference to the attached drawings.

Figure 1:
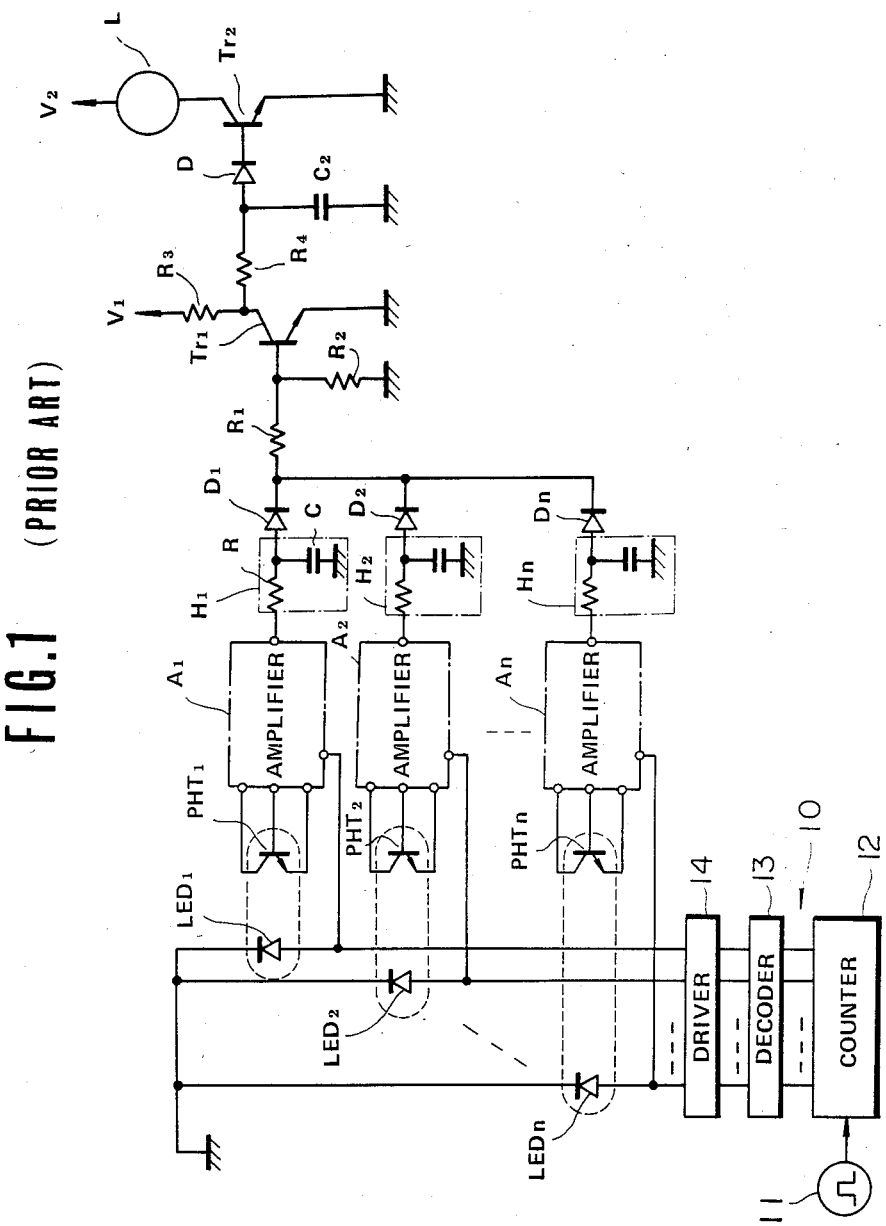
FIG. 1 is a circuit diagram showing a prior art of the beam type safety device.
Figure 2:
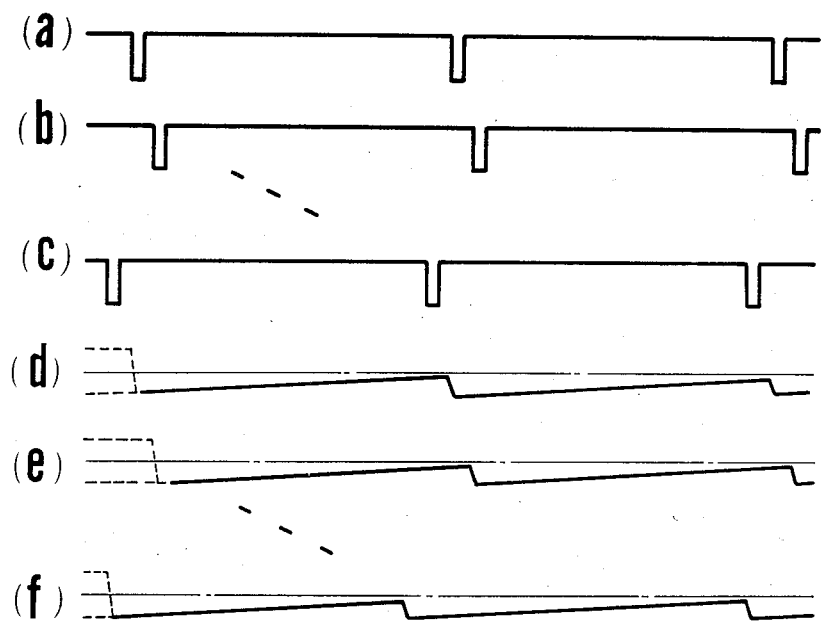
FIG. 2 is a wafeform diagram illustrating the operation of the circuit shown in FIG. 1.
Figure 3:
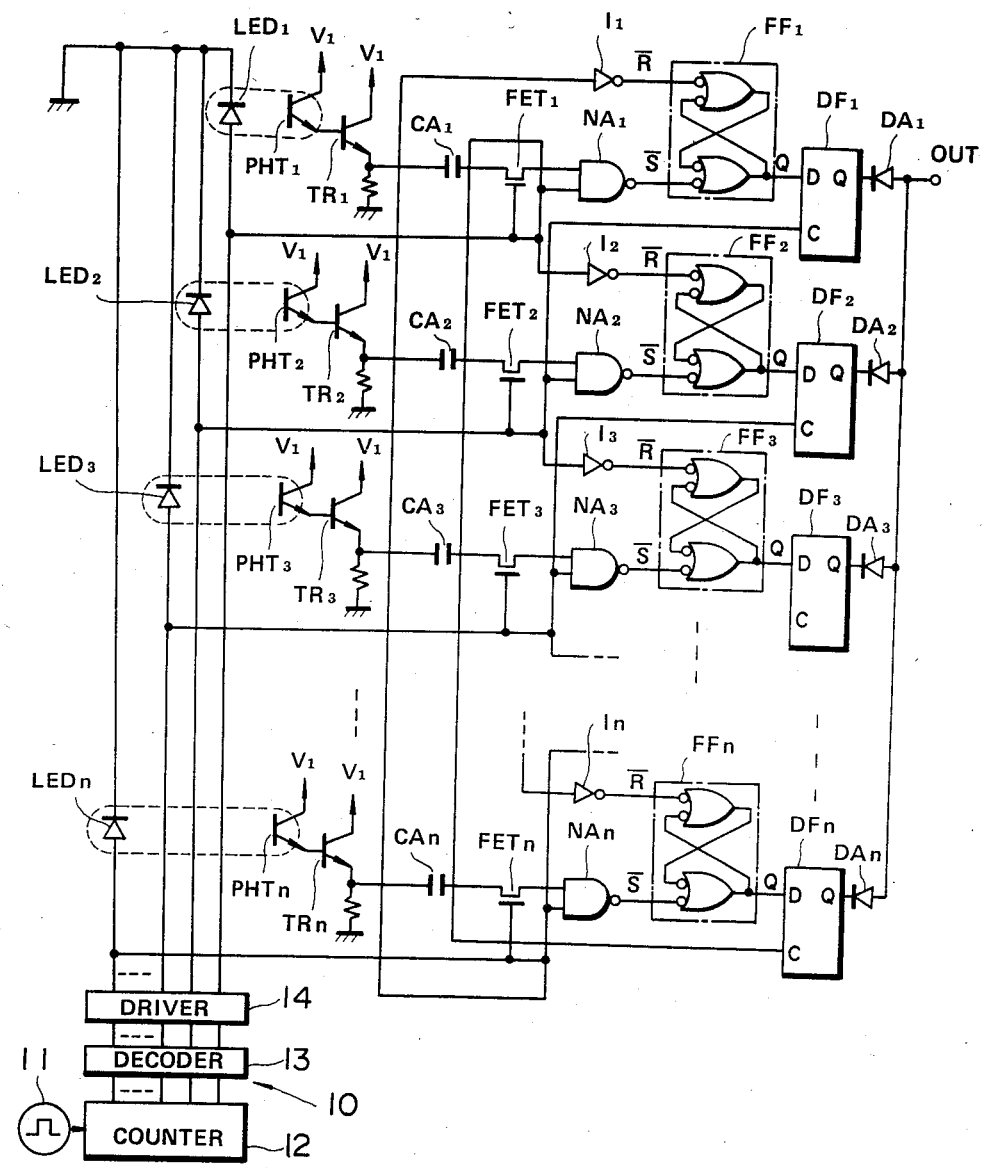
FIG. 3 is a circuit diagram showing an embodiment of the present invention.
Figure 4:
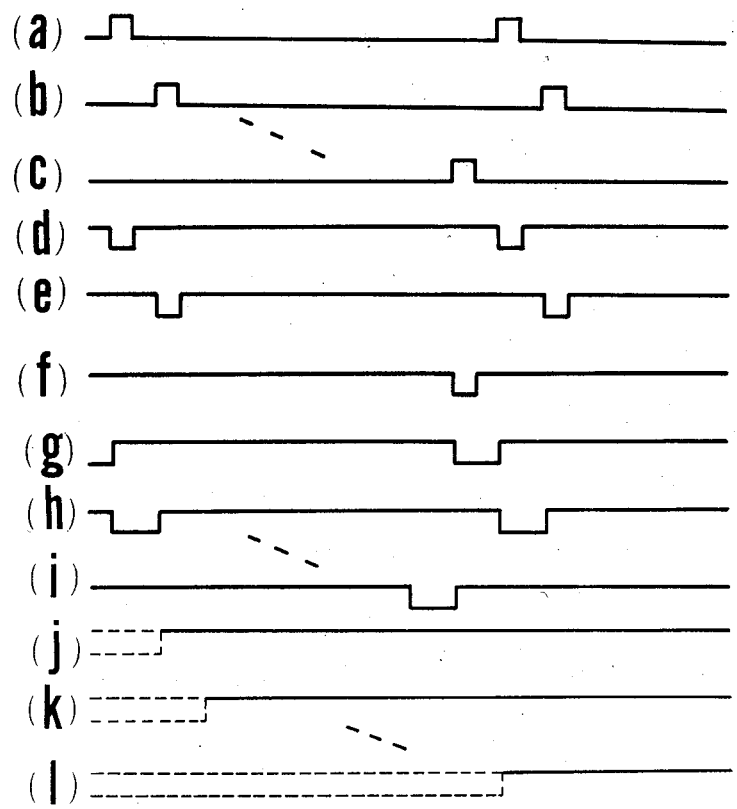
FIG. 4 is a timing chart illustrating the operation of the circuit shown in FIG. 3.

FIG. 3 shows an embodiment of the light interception detection circuit of the beam type safety device of the present invention. In FIG. 3, elements functionally identical to those of the prior art circuit shown in FIG. 1 are given to the same reference numerals and symbols. The configuration of a scan circuit 10 for controlling the lighting of light emitting diodes LED1 to LEDn is the same as prior art example shown in FIG. 1. Light beams emitted from the light emitting diodes LED1 to LEDn travel through the specified hazardous area (not shown) and are received at phototransistors PHT1 to PHTn. The collectors of the phototransistors PHT1 to PHTn are connected to a power source V1, and the emitters are connected to the bases of transistors TR1 to TRn. When the phototransistors PHT1 to PHTn receive the light beams from the light emitting diodes LED1 to LEDn, the transistors TR1 to TRn associated with the phototransistors PHT1 to PHTn having received light become conductive and output high level signals from the emitters thereof. The signals outputted from the emitters of the transistors TR1 to TRn are fed to one of the two inputs of NAND circuits NA1 to NAn through coupling capacitors CA1 to CAn and field effect transistors FET1 to FETn. To the gates of the field effect transistors FET1 to FETn and to the other input of each of the NAND circuits NA1 to NAn are applied drive signals (refer to (a) to (c) of FIG. 4) for the light emitting diodes LED1 to LEDn which are generated at a driver 14 of the scan circuit 10 respectively. That is, the field effect transistor FET1 to FETn is gated synchronized with the lighting of the light emitting diode LED1 to LEDn, and the NAND circuit NA1 to NAn becomes ready to operate synchronized with the lighting of the light emitting diode LED1 to LEDn.

The light emitting diodes LED1 to LEDn light sequentially and consequently, the transistors TR1 to TRn become conductive sequentially when none of the light beams from the light emitting diodes LED1 to LEDn to the phototransistors PHT1 to PHTn is intercepted, and pulse signals as shown in (d) to (f) of FIG. 1 are output from the NAND circuits NA1 to NAn. These signals are fed to the respective reverse set input $\bar{S}$ of RS flip-flops FF1 to FFn each comprised of two NOR circuits. On the other hand, to the respective reverse reset input $\bar{R}$ of the flip-flop FF1 to FFn a drive signal for the light emitting diode to be scanned immediately before the light emitting diode LED1 to LEDn corresponding to the relevant flip flop FF1 to FFn (for example, the light emitting diode LEDn for the flip flop FF1 and the light emitting diode LED1 for the flip-flop FF2) is fed through inverter I1 to In. Accordingly, the outputs of the flip-flops FF1 to FFn become as shown in (g) through (i) of FIG. 4. The output of the flip-flop FF1 to FFn is fed to a data input terminal D of D type flip-flop DF1 to DFn. To a clock input terminal C of the D type flip-flop DF1 to DFn a drive signal for the light emitting diode to be scanned immediately after the light emitting diode LED1 to LEDn corresponding to the relevant flip-flop DF1 to DFn (for example, the light emitting diode LED2 for the flip flop DF1 and the light emitting diode LED3 for the flip flop DF2) is fed. Accordingly, the output Q of the Delay flip-flop DF1 to DFn is kept at the high level unless the light beam from the corresponding light emitting diode LED1 to LEDn to the phototransistor PHT1 to PHTn is intercepted (refer to (j) to (l) of FIG. 4). The outputs of the Delay flip-flops DF1 to DFn are integrated through the respective diodes DA1 to DAn, and directed to an output terminal OUT.

In the case that none of the light beams from the light emitting diodes LED1 to LEDn to the phototransistors PHT1 to PHTn is intercepted, the outputs Q of the Delay flip-flop DF1 to DFn remain at the high level, and a high level signal is output from the output terminal OUT. On the other hand, when at least one of the light beams from the light emitting diodes LED1 to LEDn to the phototransistors PHT1 to PHTn is intercepted (for example, the light beam from the light emitting diode is intercepted), the output of the NAND circuit corresponding to the intercepted light beam, the NAND circuit NA2 does not become low level even at the scan time of that beam, and the flip-flop FF2 is not set accordingly, that is, the output Q of the flip-flop FF2 becomes low level. As a result, the output Q of the Delay flip-flop DF2 corresponding to the flip-flop FF2 also becomes low level at the drive signal generation timing for the light emitting diode LED3, and consequently the signal at the output terminal OUT becomes low level.

As described above, according to this embodiment, when a light beam is intercepted, the light interception detection output is produced at the scan timing of the light beam next to the intercepted light beam. This operation can be performed irrespective of the number of light beams.

Figure 5:
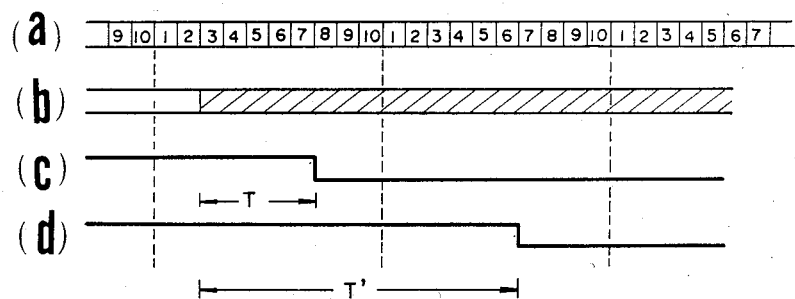
FIG. 5 is a timing chart for the comparison of the operation of the embodiment shown in FIG. 3 and the operation of the prior art circuit shown in FIG. 1.

Now, the comparison of the light interception detection time according to this embodiment and that of the prior art circuit shown in FIG. 1 will be made with reference to FIG. 5. In this comparison, it is assumed that the number of light beams covering the specified hazardous area is 10, and that the seventh beam is intercepted while the third beam is being scanned. FIG. 5(a) shows the scan time of each beam, FIG. 5(b) shows the light interception timing when the seventh beam is intercepted, FIG. 5(c) shows the light interception detection output according to the aforementioned embodiment, and FIG. 5(d) shows the light interception detection output of the prior art circuit. In FIG. 5(c) and (d), the low level indicates the light interception detection state. As evident from the drawing, the light interception detection state is brought about at the scan timing of the eighth beam in the case of this embodiment, while the light interception is detected at the scan timing of the seventh beam after one scan cycle is completed in the case of the prior art circuit. It should be noted here that the light interception detection time T' of the prior art circuit shown in FIG. 5 is a minimum time, and it may be longer in an actual operation because a certain margin should be provided to the time constant of the hold circuit and due to the time constant by the resistor R4 and the capacitor C2.

What is claimed is:

1. A beam type safety device comprising:
   driving means for sequentially providing a driving signal to a plurality of light emitting elements;
   a plurality of light receiving elements respectively disposed to be confronted by said plurality of light emitting elements, for receiving light from the corresponding light emitting elements;
   a plurality of first memory means respectively provided to be associated with said plurality of light receiving elements, for storing the output of each of said light receiving elements with a timing of the driving signal for the light emitting element corresponding to said each light receiving element, the stored output of said each light receiving element being cleared with a timing of the driving signal for the light emitting element corresponding to the light receiving element preceeding to said each light receiving element;
   a plurality of second memory means respectively provided to be associated with said plurality of first memory means, for storing the output of each of said plurality of first memory means with a timing of the driving signal for the light emitting element corresponding to the light receiving element next to said each light receiving element; and
   output means for outputting a light interception detection signal when at least one of said second memory means stores data representing that light beam from the corresponding light emitting element was intercepted.

2. A beam type safety device according to claim 1, wherein said driving means comprises a clock pulse generator for generating a clock pulse of a predetermined period, a counter for counting the output of said clock pulse generator, a decoder for decoding the count value of said counter into the corresponding light emitting element number and a driver for producing said driving signal for driving said light emitting elements based on the output of said decoder.

3. A beam type safety device according to claim 1, wherein said first memory means is an RS flip-flop, to the set terminal of which the output of the corresponding light receiving element is applied and to the reset terminal of which the driving signal for the light emitting element corresponding to the light receiving element of the preceeding stage is applied, and said second memory means is a delay flip-flop, to the data input terminal of which the output of the corresponding first memory means is applied and to the clock input terminal of which the driving signal for the light emitting element corresponding to the light receiving element of next stage is applied.

4. A beam type safety device according to claim 3, wherein said first memory means feeds the output of the corresponding light receiving element to said set terminal of the RS flip-flop through a coupling capacitor and first and second gate means respectively operated by the driving signal for the light emitting element corresponding to said light receiving element.

5. A beam type safety device according to claim 1, wherein said output means comprises a plurality of diodes, to the cathode of which the output of the corresponding second memory means is applied and the anode of which is connected to an output terminal.

* * * * *